United States Patent [19]

Itzel et al.

[11] Patent Number: 4,705,191
[45] Date of Patent: Nov. 10, 1987

[54] MIXING AND SPRAYING DEVICE

[75] Inventors: Hanshelmut Itzel, Gau-Algesheim; Volker Barth, Alzey, both of Fed. Rep. of Germany

[73] Assignee: Celamerck GmbH & Co. KG, Ingelheim am Rhein, Fed. Rep. of Germany

[21] Appl. No.: 760,127

[22] Filed: Jul. 29, 1985

[51] Int. Cl.$^4$ .............................................. B67D 5/40
[52] U.S. Cl. ..................................... 222/80; 222/136; 222/383; 141/95; 141/326; 141/364
[58] Field of Search .................. 222/80, 129, 135–136, 222/145, 383, 478, 481–482, 489, 541; 206/222; 215/6, DIG. 8; 220/23; 141/2, 18, 95, 325–326, 363–366; 239/304, 309

[56] References Cited

U.S. PATENT DOCUMENTS

| | | | |
|---|---|---|---|
| 727,144 | 5/1903 | Johnson | 141/95 X |
| 3,156,369 | 11/1964 | Bowes et al. | 206/222 |
| 3,655,096 | 4/1972 | Easter | 222/82 |
| 4,088,246 | 5/1978 | Klingaman | 222/88 |

FOREIGN PATENT DOCUMENTS

| | | | |
|---|---|---|---|
| 247174 | 1/1961 | Australia | 222/80 |
| 1939086 | 5/1974 | Fed. Rep. of Germany | |
| 2441406 | 3/1975 | Fed. Rep. of Germany | 206/222 |
| 2432290 | 1/1976 | Fed. Rep. of Germany | 206/222 |
| 2306898 | 11/1976 | France | 222/80 |
| 2506726 | 12/1982 | France | 206/222 |

Primary Examiner—Joseph J. Rolla
Assistant Examiner—Michael S. Huppert
Attorney, Agent, or Firm—Weissenberger, Hammond & Littell

[57] ABSTRACT

A re-usable mixing and spraying device in which the fill opening and the hand pump used to discharge the spray solution are arranged at different heights, and a concentrate and a diluent may be mixed together in the device which is tightly sealed off from the outside, the concentrate being enclosed in a sealing cap which can be ruptured by the device, so that the reservoir enclosing the concentrate is closed when the sealing cap and fill opening are loosely connected and opened toward the diluent when the sealing cap and fill opening are tightly connected.

3 Claims, 9 Drawing Figures

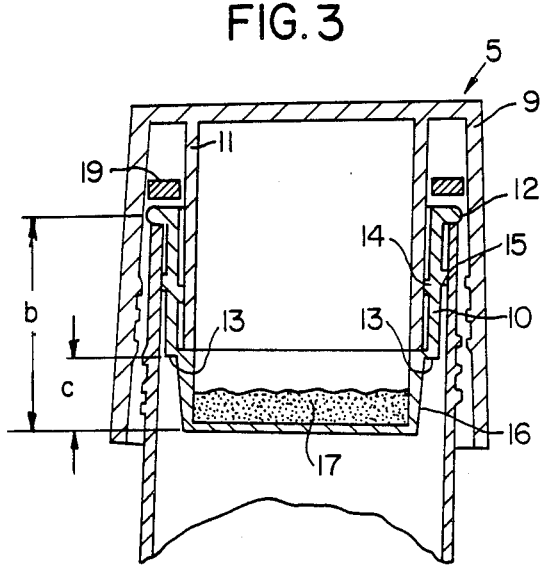
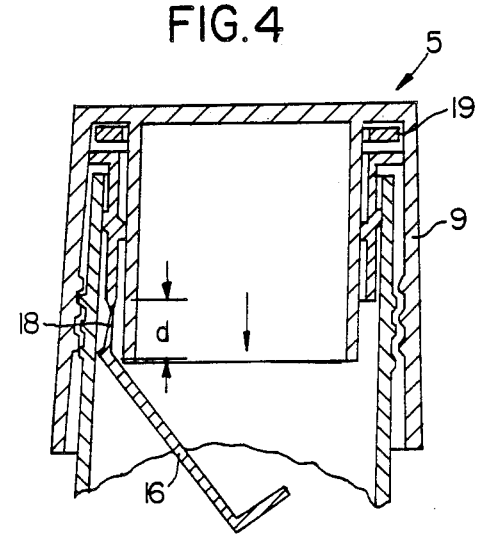
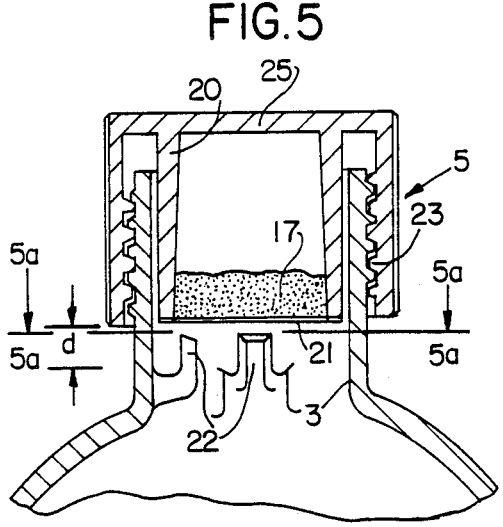
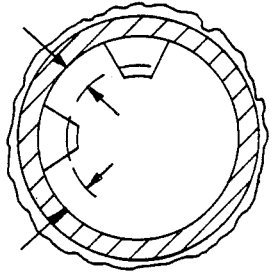
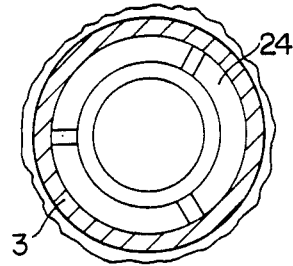
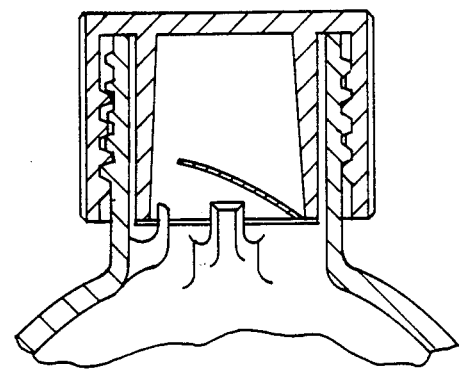
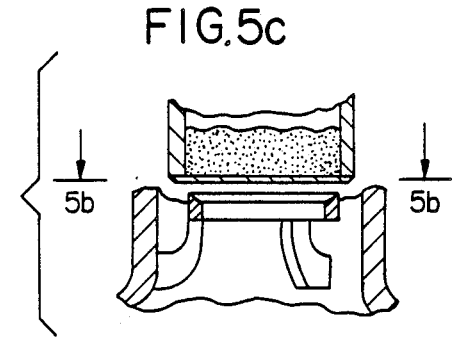

MIXING AND SPRAYING DEVICE

This invention relates to a device in which concentrates, particularly concentrated plant protecting agents, can be safely diluted with a suitable liquid to the concentration suitable for use, without any errors of dosage, and from which the resulting solution can be disseminated by spraying or atomizing.

BACKGROUND OF THE INVENTION

One of the most important methods of disseminating plant protecting agents is by spraying of aqueous plant protecting solutions with the aid of a spraying device. Different types of spraying devices are known, from which the substance to be sprayed is discharged by means of a hand-operated or motor-driven pump. The spray liquor is prepared separately shortly before dissemination by diluting a concentrated active substance with water or other suitable liquid. A major disadvantage of this process is the fact that the user comes into contact with the concentrated active substance when mixing the spray liquor. In addition, wrong dosages may easily be used and frequently more substance is applied than is necessary and sensible in order to protect the plant. Furthermore, there are problems with the elimination of the left-over plant protecting agent and with storing any unused concentrated plant preservative.

The disadvantages described above are encountered particularly by small-scale users who employ the sprays in the house and garden, since such people often require only very small quantities of plant protecting agent but, as a result of the variety of the plants they cultivate, they keep a large number of plant treatment compositions having different activities on hand. Thus, the small-scale user must always ensure that opened packages of concentrated active substances are properly stored.

Modern plant treatment compositions have been developed to such an extent that only tiny quantities of active substance are required to achieve the desired results. When plant treatment compositions are used on a small scale, only tiny volumes of the solvent concentrate are required in order to produce the small quantities of spray liquor required, such as 0.5 to 10 liters. It is very difficult to measure these quantities of concentrate, which are frequently less than 1 ml per liter of spray liquor.

Errors in measurement, leading to overdosing and underdosing, are therefore frequent. Dilution of the solvent concentrate would indeed improve accuracy of measurement, but the disadvantage is that more excipients and solvents are used than are necessary to provide the plant protection sought. Furthermore, dilute solutions are less stable than concentrated solutions.

Spray-Liquors are also frequently of the wrong strength since many users have difficulty calculating the dosage of concentrated active substance corresponding to the capacity of the pressure spray from the concentrations recommended by the manufacturer.

Ready-to-use aqueous solutions of plant protecting agent diluted to the proper concentration for use, packed in bottles with pump atomizers, are now also available. These eliminate the risk of wrong dosages, and the user does not come into contact with the concentrated active substance. However, the storage stability of such aqueous formulations is generally unsatisfactory. Moreover, the costs of storage and transport of bottles of this kind are high since the solutions as a rule contain more than 99% water.

To solve the problem life and accuracy of dosing, German Auslegsschrift No. 1,939,086 discloses a container for storage and preparation of a spray liquor of plant protecting agent:

A plurality of cups or beakers in which the concentrate is stored separately from the diluent are inserted into a bottle containing the diluent. When a hand pump is fitted on the bottle, the feed pipe of the pump penetrates the bases of the cups from the outside inwards.

After the hand pump has been tightly sealed, the concentrate can be mixed with the diluent and then sprayed using the hand pump.

This apparatus solves the problem of inadquate storage stability since the active substance and diluent are separated from each other until the moment of use. However, the following points, which may be summarized as follows, remain unsolved.

The cups of concentrate are opened from the outside inwards. There is a risk of undiluted concentrate running out.

The feed pipe passes through the individual cup bases only to an extent which is limited by the radius of the feed pipe. For this reason, and because the feed pipe remains in the opening, the diluent and concentrate can only be partially mixed together, particularly if the concentrate has a fairly high viscosity.

Owing to the fact that the function of the feed pipe is to penetrate the cup base, it must be very rigid and cannot be flexible. This means that the dilution prepared cannot be completely removed from the container by spraying. A residual amount of dilution is left behind.

Considered in terms of the overall structure of the system, this device can only be sensibly used if the diluent and concentrate are sold packed together in a bottle. Consequently, the above-mentioned problems of high storage and transport costs are not solved.

Heretofore, there has been no entirely satisfactory re-usable device for disseminating spray liquors of plant protecting agents which combines the aspects of maximum possible safety of use, good storage stability, low storage and transport costs and good miscibility of concentrate and diluent.

OBJECTS OF THE INVENTION

It is an object of the present invention to provide a re-usable device for disseminating spray liquors of plant protecting agents which combines the aspects of maximum possible safety, good shelf life, low storage and shipping costs, and good miscibility of concentrate and diluent.

Other objects and advantages of the invention will become apparent as the description of it proceeds.

DESCRIPTION OF THE INVENTION

The above objects are achieved by means of the device of the instant invention shown in the accompanying drawings in which FIG. 1 shows a container (1) with hand pump (2), fill opening (3) and sealing cap (5) in the form of a two-necked flask;

FIG. 3 shows a sealing cap (5) with detachable cup base temporarily connected to the fill opening (3);

FIG. 4 shows a sealing cap (5) with detachable cup base with the fill opening (3) fixedly connected;

FIG. 5 shows a sealing cap (5) temporarily connected to the fill opening (3) (FIG. 5a) and two cross sections through the fill opening (FIGS. 5b, 5c) level with the elements (22) and (24); and FIG. 6 shows a sealing cap (5) fixedly connected to the fill opening (3).

The function of the device of the instant invention will first be explained with reference to the illustrative embodiment shown in FIGS. 1, 3 and 4.

Container (1) has two openings arranged at different heights. One opening (6) serves as a securing point for the hand pump (2).

Figure 1:
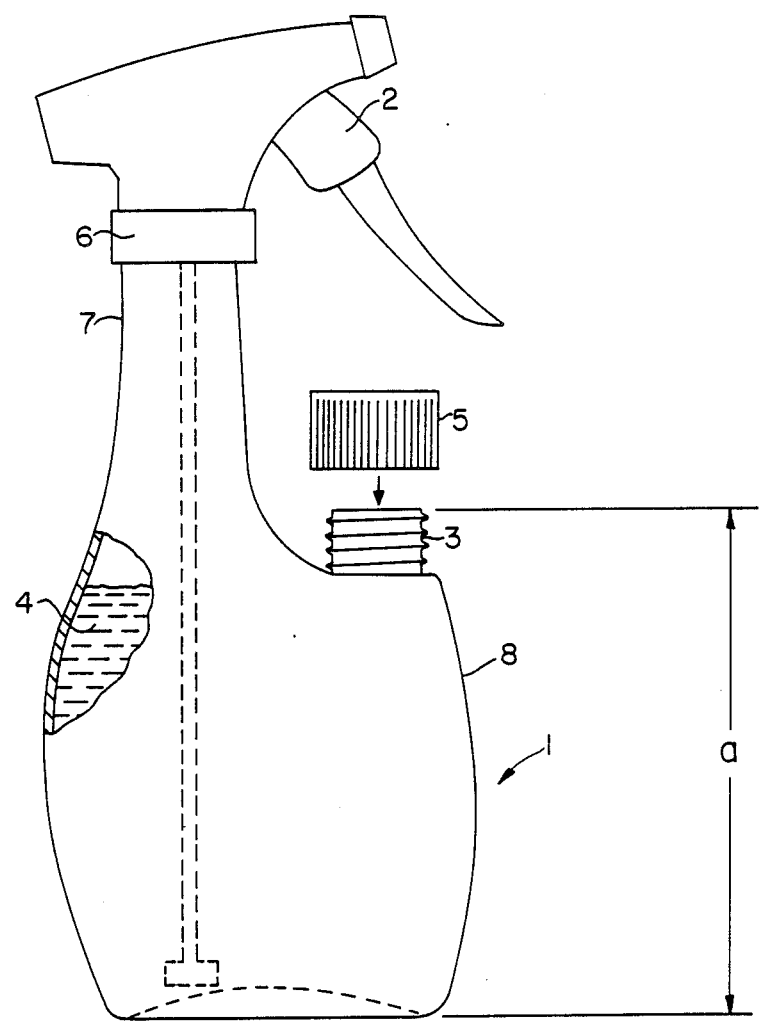

In FIG. 1 the device of the present invention is shown in the form of a two-necked flask. The longer neck (7) carrying the hand pump is shaped so that is also serves as a lower handle section for the hand pump (2). The shorter neck (8) carries at its upper end, at a spacing (a) from the base of the flask, the threaded fill opening (3) onto which a threaded sealing cap (5) containing a concentrate can be screwed.

FIGS. 3 and 4 are detailed drawings of embodiments of the sealing cap (5) which consists essentially of a screw cap (9) and a cup (10). Inside the screw cap is a collar (11) projecting radially from the base, on the outer surface of which is fitted the cup (10). The cup (10), preferably made of plastic, has on its upper portion an outwardly directed rim (12) which is shaped so that it fits onto the upper rim of the fill opening (3) without projecting. The height (b) of the rim (12) defines the depth of drop of the cup (10) into the fill opening (3). In its lower portion the cup (10) tapers at an annular shoulder (13) designed as a weakened preset breaking point. The lower rim of the collar (11) acts as an abutment edge on which the annular shoulder sits flush. The cup (10) may be sealed with radially encircling bead-like thickened portions (14) relative to the outer surface of the collar (11) and (15) relative to the fill opening (3) which carries the sealing cap (5). When the sealing cap (5) is screwed in, the lower rim of the collar (11) presses on the annular shoulder (13) designed as a weakened breaking point and severs the cup (10) at the level (c), the lower part (16) falling away so that the contents (17) are emptied into the container (1). The lower part (16) of the cup (10) may also be designed as a flat disc, that is, the weakened breaking point is located directly on the lower rim of the cup (10) or is a component of the cup base.

FIG. 4 shows a special embodiment of the cup (10) in which the lower part (16), with the sealing cap (5) and fill opening (3) fixedly connected, does not fall away but is still attached at one point (18) of the annular shoulder (13). Since the screw cap (9) must be screwed in by a distance (d) until it fits tightly, the collar (11) is pushed downward by a distance (d) and presses the lower part of the cup to one side so that the contents (17) are emptied completely or so that a sufficiently large opening is left to enable the contents (17) to be washed out with a diluent provided in the container (1) without the partially removed cup (16) getting in the way.

The incomplete removal of the base (16) can be achieved by simple means such as, for example, partial thickening of the weakened breaking point on shoulder (13) in a narrowly defined area, by the choice of a plastic material which expands under compressive stress, or by abutment of the edge of the collar (11) on the annular shoulder (13) only at one point. However, it is also possible to use a cup (10) in which the base (16) is completely removable, while it is possible, in particular, by simple means to ensure that the opening of the reservoir, that is, the falling away of the base (16) of the cup, is indicated by a click or a distinct change in the resistance to turning when the sealing cap (5) is screwed on. Simple means can be used to ensure that the cup (10) is removed when the sealing cap (5) is unscrewed and is not left behind in the fill opening (3). This feature is achieved by having the cup (10) sit firmly on the outer surface of the collar (11) and abut less firmly on the inner surface of the fill opening (3). The reduced seal tightness of the sealing cap (5) can be improved by means of a ring seal (19) inserted between the collar (11) and the outer screw cap (9).

The method of operation of the device of the instant invention is as follows: The user first introduces the diluent (4), usually water, through the fill opening (3) into the container (1) having hand pump (2) mounted thereon, and then a sealing cap (5) containing the concentrate (17) is screwed onto fill opening (3). As it is screwed on, the cup (10) is ruptured and the concentrate (17) can be mixed with the diluent by shaking the container (1) without the need for the user to come into contact with the concentrate (17).

In addition to the sealing caps described above to illustrate the principle of operation with reference to FIGS. 3 and 4, in which the reservoir is opened by means of an angularly shaped part of the sealing cap, it is also possible to use sealing cap systems in which part of the fill opening is angular or pointed so that the reservoir is closed when the sealing cap (5) and fill opening are loosely connected and opened when the sealing cap (5) and fill opening are tightly connected.

FIG. 5 shows a sealing cap (5) connected to the fill opening (3) in a loosely sealed position. With reference to this embodiment and FIG. 6, which illustrates the same cap in its final sealed position, the principle of operation of sealing caps (5) in which the reservoir is opened by angular or pointed parts of the fill opening (3) will now be explained.

This type of sealing cap which can be connected to the fill opening (3) by means of the thread (23) contains a collar (20) extending inwardly at right angles from the base of the cap, the lower end of this collar being closed off by means of a closure element (21).

The cavity defined by the cap base (25), collar (20) and closure element (21) forms the reservoir in which the concentrate (17) is enclosed.

The closure element (21) is preferably a film or foil connected in sealed manner to the lower edge of the collar (20). On the inner wall of the fill opening (3) there are one or more spikes (22) which are aligned at a spacing (c) from the inner wall parallel to the inner wall with their upper ends pointing to the fill opening. When the sealing cap (5) is screwed until it fits tightly, the reservoir is pushed into the fill opening by a distance (d). The spike (22) passes through the film or foil (21) so that communication is established between the reservoir and the diluent.

The spike (22) may also be constructed as a continuous annular shoulder (24). This embodiment is illustrated in FIGS. 5b and 5c which show cross-sections through the fill opening at the level of element (22) or (24). FIG. 5b describes a possible arrangement of two spikes (22) which are aligned at a spacing (c) from the inner wall (3) toward the center of the fill opening (3). FIG. 5c shows an element (24) in the form of an annular shoulder which is also spaced at a distance (c) from the inner wall of the fill opening (3) toward the center of the fill opening. Other sealing caps (5) which are opened by elements to be associated with the fill opening are described in German Gebrauchsmuster Application No. G 85 02 007, which is incorporated by reference herein.

Figure 2:
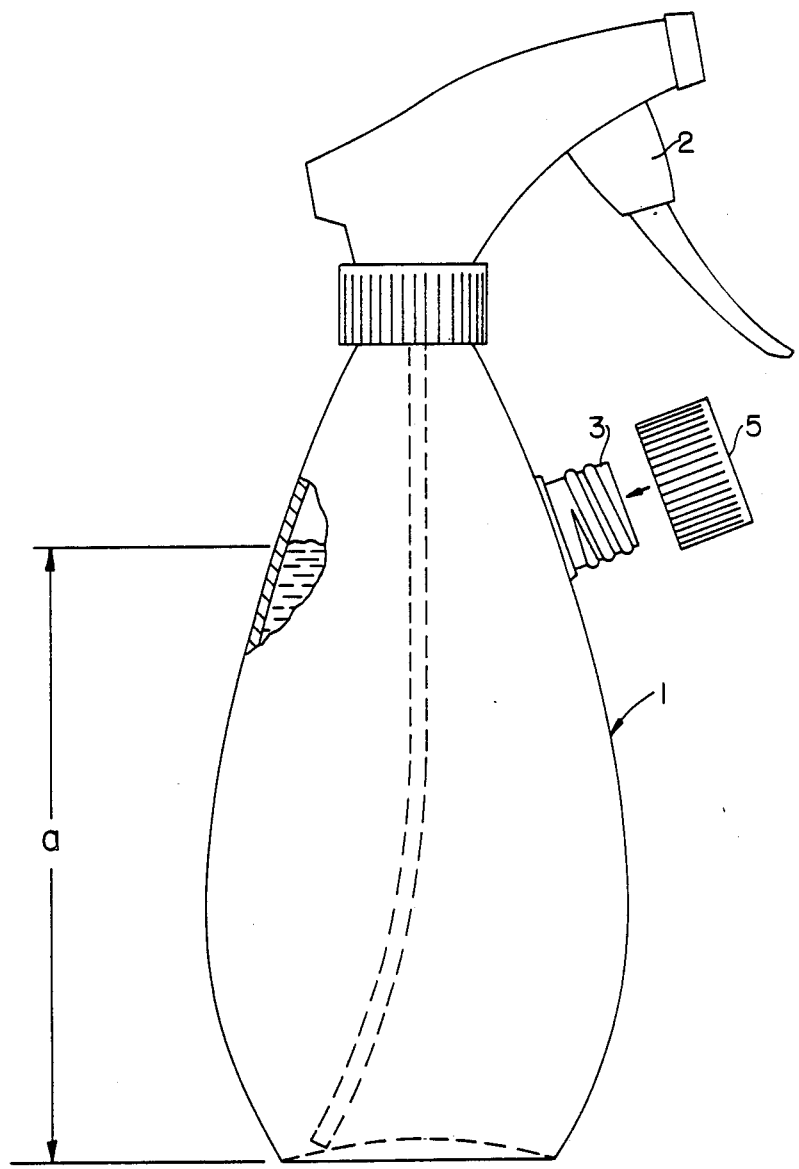
FIG. 2 shows a container (1) with hand pump (2), sealing cap (5) and laterally positioned fill opening (3)

The fill opening may be located on the second, shorter neck of a two-necked flask (FIG. 1) or laterally on the neck of a single-necked flask carrying the hand pump (2) (FIG. 2), but should always be below the hand pump (2) so that it is arranged at the height (a) between the base of the flask and the hand pump and thus determines two fill levels in the device of the present invention.

Fill level I is the maximum quantity of diluent (4) that can be poured into container (1) through fill opening (3) when it is held upright.

Fill level II is the volume of air above the prescribed level of diluent (4).

The advantages of the device of the instant invention become readily apparent in the preparation of spray liquors for plant protection:

The metering of the concentrate (17) is carried out by the manufacturer of the sealing cap (5) and is accurately matched to the quantity of diluent (4). All that the user is asked to do is to introduce the diluent (4), usually water, through the fill opening (3) up to the level defined by height (a) in FIGS. 1 and 2. This simple procedure rules out errors of dosage.

If he or she follows instructions, the user can only fill the flask up to the level (a) determined by the fill opening (3) with the diluent (4), usually water. Above this level there is a quantity of air present, determined by the total capacity of the flask. If the sealing cap (5) containing the concentrate (17) is connected to the fill opening, in the case of a fixed closure the reservoir opens into the diluent (4), as described above. Since the reservoir is then either already immersed in the diluent or is just about to be immersed, a gentle shaking movement is sufficient to cause the diluent (4) to rinse out the reservoir and wash out the concentrate (17). Moreover, the enclosed air (level II) ensures that the entire contents of the flask are mixed under turbulent conditions, ensuring particularly rapid and total mixing of the concentrate (17) and diluent (4). The ratio of the two filling levels II and I is about 1:20 to 1:2 (air to diluent) to ensure thorough mixing. A ratio of 1:10 to 1:5 is preferred.

The improvement in the mixing of the diluent (4) and concentrate (17) by the enclosure of a defined quantity of air is demonstrated particularly when

- small quantities of concentrate (17) are supposed to be mixed with large quantities of diluent (4).
- the concentrate (17) and diluent (4) have different vicosities.
- the concentrate (17) is in solid (powder) form.
- the concentrate (17) is only difficultly dissolved or wetted with the diluent (4) in spite of the addition of detergents.
- micells of the concentrate in diluent are supposed to be produced as the product of the mixing of the concentrate (17) and diluent (4).

The majority of concentrated plant protecting agents contain detergents which foam when turbulently mixed with air, and these foams still rise some minutes after the mixing operation. In the case of freshly prepared spray liquors of plant protecting agents, therefore, the spray liquor cannot be filled into a spraying device until the foam has subsided. By contrast, with the device of the present invention, the spray liquor can be disseminated immediately after mixing from the same container. This advantageous feature is achieved by virtue of the fact that the device of the present invention is constructed as an outwardly closed system wherein the concentrate, kept separate from the container (1), is enclosed in a reservoir, the opening of the reservoir and the mixing of the concentrate and diluent take place inside the system, and spraying can also be carried out without opening the system, so that the user does not come into contact with the concentrate or with any foaming of the spray liquor at any time. Nevertheless, the device of this invention permits optimum mixing with accurate metering.

The improved mixing of the concentrate (17) and diluent (4) in the device of the instant invention and the greater reliability in use is particularly apparent in comparison with the device disclosed in German Auslegeschrift No. 1,939,068. There, the fill opening and dispensing opening are associated with the same opening in the flask. Therefore, the feed pipe of the hand pump must necessarily first open the reservoir outwardly before it can be opened toward the diluent. The reservoir is only opened into the diluent to the extent to which it can be pierced by the feed pipe. Since, in addition, the feed pipe remains in this opening, it is considerably more difficult to rinse out the concentrate.

The problem of removal or safe storage of opened packages containing plant protecting agent concentrates does not arise with the device of the instant invention since the plant protecting agent is safely stored in the sealing cap until the moment of use and is not exposed to any factors which would decompose the active substance, such as light, humidity, oxygen in the air, etc. The plant protecting agent may be sprayed in the form of an emulsion, suspension, dispersion or solution, where suitable emulsifiers and/or wetting agents may be added to the concentrate.

In theory, all sprayable liquids are suitable as the diluent, but water is preferred. The device of the present invention makes it possible to spray dilute solutions of substances which are unstable in solution, for instance in water, for any length of time since the spray liquor is not produced until shortly before it is required, and the substance can be stored in the form of a stable formulation having a long shelf life.

Another major advantage of the device of the instant invention is the fact that it is also possible to use physically unstable multiphase systems as the concentrated plant protecting agent. In conventional plant protection, systems in which two or immiscible liquid or solid phases occur have heretofore been little known since accurate metering is impossible if the entire contents of the mixture are not used all at once.

Consequently, non-miscible multiphase plant preservative concentrates have heretofore not been used. In the device of the present invention, however, all the substances contained in the sealing cap (5) are transferred into the spray. It is of little importance whether the concentrate consists of a homogeneous phase or a multiphase system.

Another advantage relating to the safety of use of spray liquors of plant protecting agents is the fact that the sealing cap (5) remains on the container (1) until all the spray liquor has been used up and the user always knows what substance is contained in the container (1) by virtue of printed information applied to cap (5).

The use of the device of the instant invention is not restricted to plant protection. Indeed, it can advantageously be used whenever a mixture is to be prepared from a concentrate and a suitable diluent and then disseminated by spraying.

It may therefore be used, for example, for disinfectants, for applying films of lacquer or adhesive, for instance with a hardener in the sealing cap as the concentrate, and also for cleaning agents or preservatives.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A diluting and dispensing container for diluting a chemical concentrate therein and dispensing the diluted concentrate therefrom, said container comprising a container body having a relatively wide bottom which narrows upwardly into a neck opening having dispensing pump means mounted thereon, said container body defining a diluting compartment adapted to be partially filled with a liquid diluent to provide a volume of diluent and a discrete volume of air within said diluting compartment, an externally threaded fill opening for introducing said diluent into said diluting compartment, said fill opening being located on the container body in proximity to the air/diluent interface, an internally threaded closure cap threadedly engaged for closing and opening rotation with said fill opening, a removable frangible capsule containing a dilutable chemical concentrate seated in said fill opening, said capsule adapted to be ruptured in response to the closing rotation of said closure cap on said fill opening and thereby permit contact between said concentrate and said diluent, and a dip tube attached to and in communication with said dispensing pump means and with the diluting compartment for withdrawing the diluted concentrate from the compartment.

2. A container of claim 1, whrere the volumetric ratio of air to diluent is from 1:20 to 1:2.

3. A container of claim 1, where the volumetric ratio of air to diluent is from 1:10 to 1:5.

* * * * *

UNITED STATES PATENT AND TRADEMARK OFFICE
CERTIFICATE OF CORRECTION

PATENT NO. : 4,705,191

DATED : November 10, 1987

INVENTOR(S) : HANSHELMUT ITZEL ET AL.

It is certified that error appears in the above-identified patent and that said Letters Patent is hereby corrected as shown below:

Title page, insert the following:

```
--  [30]    Foreign Application Priority Data
       August 4, 1984  [DE] FEDERAL REPUBLIC OF GERMANY
       G 84 23 325.7  --.
```

Signed and Sealed this

Twenty-fourth Day of January, 1989

Attest:

DONALD J. QUIGG

*Attesting Officer*  *Commissioner of Patents and Trademarks*